(12) United States Patent
Kronenberg (10) Patent No.: US 7,113,996 B2
(45) Date of Patent: Sep. 26, 2006

(54) METHOD AND SYSTEM FOR SECURED TRANSPORT AND STORAGE OF DATA ON A NETWORK

(76) Inventor: Sandy Craig Kronenberg, 1 Townhouse Cir. #10, Great Neck, NY (US) 11021

( * ) Notice: Subject to any disclaimer, the term of this patent is extended or adjusted under 35 U.S.C. 154(b) by 572 days.

(21) Appl. No.: 09/910,416

(22) Filed: Jul. 20, 2001

(65) Prior Publication Data

US 2002/0078227 A1    Jun. 20, 2002

Related U.S. Application Data

(60) Provisional application No. 60/219,639, filed on Jul. 21, 2000.

(51) Int. Cl.
*G06F 15/16* (2006.01)
*G06F 11/30* (2006.01)
(52) U.S. Cl. ................. 709/229; 709/229; 709/238; 709/239; 709/218; 713/189; 713/200
(58) Field of Classification Search ........... 709/217, 709/229, 218, 238, 239; 713/201, 200, 170, 713/189
See application file for complete search history.

(56) References Cited

U.S. PATENT DOCUMENTS

| | | | | |
|---|---|---|---|---|
| 5,548,649 A | * | 8/1996 | Jacobson | 713/153 |
| 6,084,969 A | * | 7/2000 | Wright et al. | 380/271 |
| 2001/0044905 A1 | * | 11/2001 | Novak et al. | 713/201 |
| 2002/0010866 A1 | * | 1/2002 | McCullough et al. | 713/201 |
| 2002/0019933 A1 | * | 2/2002 | Friedman et al. | 713/160 |

* cited by examiner

*Primary Examiner*—Rupal Dharia
*Assistant Examiner*—Djenane M. Bayard (57) ABSTRACT

A secure transport system and a secure distribution system for transporting secure packets from a first node to a second node, comprising: a first node that creates secure packets; a first secure relay that receives secure packets and non secure packets from multiple nodes, wherein the secure relay forward each secure packet to a different secure relay and forwards non-secure packets to destination relays, and wherein the secure relay forwards each secure packet to the second node when a retrieval condition has been indicated; and a second node that creates a relay condition and receives the secure packets.

17 Claims, 5 Drawing Sheets

| VER. | IHL | TOS | TOTAL LENGTH | |
|---|---|---|---|---|
| IDENTIFICATION | | | FLAGS | FRAG. OFFSET |
| | PROTOCOL | | HEADER CHECKSUM | |
| SOURCE ADDRESS | | | | |
| DESTINATION ADDRESS | | | | |
| OPTIONS | | | | |
| DATA | | | | |

FIG. 3

| SECURITY PARAMETERS INDEX | | |
|---|---|---|
| INITIALIZATION VECTOR | | |
| PAYLOAD DATA | | |
| ......PADDING | PAD LENGTH | PAYLOAD TYPE |

FIG. 4

| RETRIEVAL KEY | | |
|---|---|---|
| SECURITY PARAMETERS INDEX | | |
| INITIALIZATION VECTOR | | |
| PAYLOAD DATA | | |
| .....PADDING | PAD LENGTH | PAYLOAD TYPE |

METHOD AND SYSTEM FOR SECURED TRANSPORT AND STORAGE OF DATA ON A NETWORK

STATEMENT OF PRIORITY

Provisional Patent Application No. 60/219,639, titled "Method and System For Secure Transport and Storage of Data on a Network" filed Jul. 21, 2000 is hereby relied upon and incorporated by reference.

BACKGROUND OF THE INVENTION

A. Field of the Invention

This invention relates generally to data processing systems and, more particularly, to secured transport systems and storing data on a network.

B. Description of the Related Art

The Internet has been hailed the marketplace of the future. A computer equipped with a communication mechanism such as a modem and telephone connection is nearly all that is necessary to gain access to the Internet and shop for goods and services. A program called a Web browser, such as the NETSCAPE NAVIGATOR from NETSCAPE Corporation, makes it a simple task to traverse the vast network of information available on the Internet and, specifically, its subpart known as the "World Wide Web."

The architecture of the Web follows a client-server model. The terms "client" and "server" refer to a computer's general role as a requester of data (the client) or provider of data (the server). In conventional settings, a Web browser resides in each client and is used to access specially formatted "Web documents" that reside on Internet (Web) servers. Web clients and Web servers communicate using a conventional protocol called "HyperText Transfer Protocol" (HTTP).

In operation, a browser opens a connection to a server and initiates a request for a document. The server delivers the requested document, typically in a standard coded format such as the "HyperText Markup Language" (HTML) format. After the document is delivered, the connection is closed. The browser displays the document or performs a function designated by the document.

Every day, as more people gain access to the Web, people need to securely transmit data to one another. In response to this need, many different protocols have sprung up to enable users to transmit data securely.

For example, IPSec is a series guidelines for the protection of Internet Protocol (IP) communications. It specifies ways for securing private information transmitted over public networks. Services supported by IPSec include confidentiality (encryption), authenticity (proof of sender), integrity (detection of data tampering) and replay protection (defense against unauthorized re-sending of data). IPSec also specifies methodologies for key management. Internet Key Exchange (IKE), the IPSec key management protocol, is a series of steps that establishes keys for encrypting and decrypting information; it defines a common language on which communications between two parties is based. Developed by the Internet Engineering Task Force (IETF), IPSec and IKE together standardize the way data protection is performed, thus making it possible for security systems developed by different vendors to interoperate." (IPSEC-.ORG).

With the release of new transmission mediums and light switching technology at speeds up to 40 Gigabits per second (OC 768), the bandwidth congestion of today may soon not exist. When these restraints are gone, people around the world may wish to transport data even more securely than current methods and perhaps there may be a desire to securely store data on these new "highways." With these developments in optical DWDM technology the Internet will be able to transmit data at ever increasing rates. New DWDM systems are now in development to run at 10 trillion bits per second (10 Tbps) per fiber.

Although the overall speed and capacity of the Internet is increasing, backbone providers are looking to provide premium services that they can charge their clients additional revenue for, while clients are looking for every increasing speed and security. In other words, current security protocols are inflexible and therefore do not lend themselves well to increased speed and security. There is therefore a need to improve existing security protocols to provide users and backbone providers with a flexible and convenient way to securely transport and store data.

SUMMARY OF THE INVENTION

What is described herein is a method of using the ever-increasing capacity of the Internet and telecommunications companies backbones as a storage mechanism (for efficient delivery of any data) and a secure transport (for the possible untraceable, unanimous, ultra-secure delivery of any data). Where IPSEC ends—Secure Transport begins, taking IP Security to the next level by providing a distributed storage/ transport system providing increased security. With this new highway, Secure Transport can utilize the largest storage system and efficient secure delivery mechanism ever created, the fiber of every communications carrier.

Methods and systems consistent with the present invention solve the inherent problems with existing transport systems by providing a secured transport engine that enables a user to securely transport data to another user. A method of secure transport and storage on a network that adds to many of today's commonly used methods of Public Key Infrastructure (PKI), Internet Protocol Security (IPSEC), Digital Certificates and Certificate Authorities (CA)—and dramatically increases the security during transport, redundancy, reliability, while allowing for rapid distribution.

Secure transport can use many widely used protocols such as Ethernet and TCP/IP with slight modifications to allow for the re-direction of data instead of simply delivering data to its destination. This re-direction occurs because perhaps the requirement is not simply to transfer data back and forth between location A and B, but perhaps the requirement is to store data on the network, so at sometime in the future A or B could retrieve this data. Or perhaps A needs to send B some data, but sending that data straight to B is dangerous— along the way to B there are many opportunities for this data to be intercepted, so instead portions this data are routed though many different locations on the way to B.

Systems consistent with the present invention transport secure packets from a first node to a second node. The system comprises a first node that creates secure packets. The system also comprises a first secure relay that receives secure packets and non secure packets from multiple nodes, the secure relay forward each secure packet to a different secure relay and forwards non-secure packets to destination relays. The secure relay forwards each secure packet to the second node when a retrieval condition has been indicated. The system also comprises a second node that creates a relay condition and receives the secure packets.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview

Currently used networks can be slightly modified to not only transport data, but can also act as a secure distributed storage system/transport system unlike any other.

One example of just such a WAN is the Internet, whereby data could forever be traveling on an endless journey around the globe. What this creates is a distributed data system that only with the proper keys (perhaps employing PKI) can data be retrieved and re-sequenced. Re-assembly could happen anywhere in the world, faster than traditional methods of transport—simply because the data could potentially arrive from many different locations—only the receiving connection is the bottleneck, not the sending and receiving connections. Redundancy can be added into the system by generating multiple data streams. Security is inherent in that the data is never in any one location, is encrypted and only with the proper algorithm could the data ever be re-sequenced.

Distributing data is inherently insecure. A typical network has its secure data—should this data need to be distributed it would have to be encrypted and past on to the Internet through a VPN to its destination. This stream can easily be intercepted along many of the routers along the single route the data takes.

Figure 1:
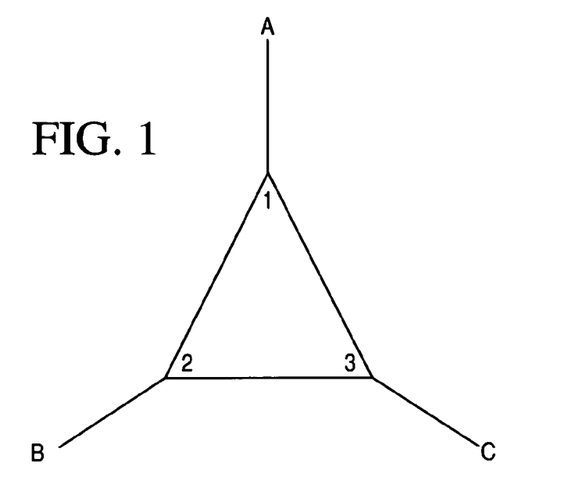
FIG. 1 is a block diagram of the architecture of a network in a manner consistent with the principle of the present invention.

If the data is sent in multiple streams to many locations "sniffing" would provide no information. The following example provides some more insight:

In FIG. 1 communication would travel normally from point A to B through relays 1 and then 2. In one example of the proposed method, data could originate from point A, could travel between relays 1, 2 and 3 in separate smaller bursts that would be redirected back and forth between 1, 2 and 3 out of sequence and in what would seem to be a random fashion. One re-sequencing scheme could be to generate the proper key that would instruct the relays to send any data with the matching lock to a specific IP address. Once the all of the data arrived at the destination another key would decrypt and re-sequence the data.

If data was sent to the network to be stored, you could imagine that even if someone were to "sniff" the network lines it would do a "malicious interceptor" no good. The reason is due to the data being sent along multiple paths in random order, all while being encrypted.

Multiple Keys are necessary (in this example we use 3 keys): Imagine sniffing the communication line somewhere between relay 1 and 2. Pieces of data from A being sent to B would be going in both directions completely out of sync. Also, it is possible that some of the data would never cross the link between 1 and 2. Which is why one would require a "Retrieval Key"—to assure that all of the pieces of the puzzle are gathered. Once all of the data was gathered one would need to sort out which fragments of data are duplicates and in which order they go, hence the need for a "Re-sequencing Key", finally the IPSec datagram (requiring an "Encryption Key") encapsulates the traditional TCP/IP packet. Note that the Re-sequencing is part of the payload of a IPSec datagram and may or may not be encrypted depending on the level of security required.

Figure 2:
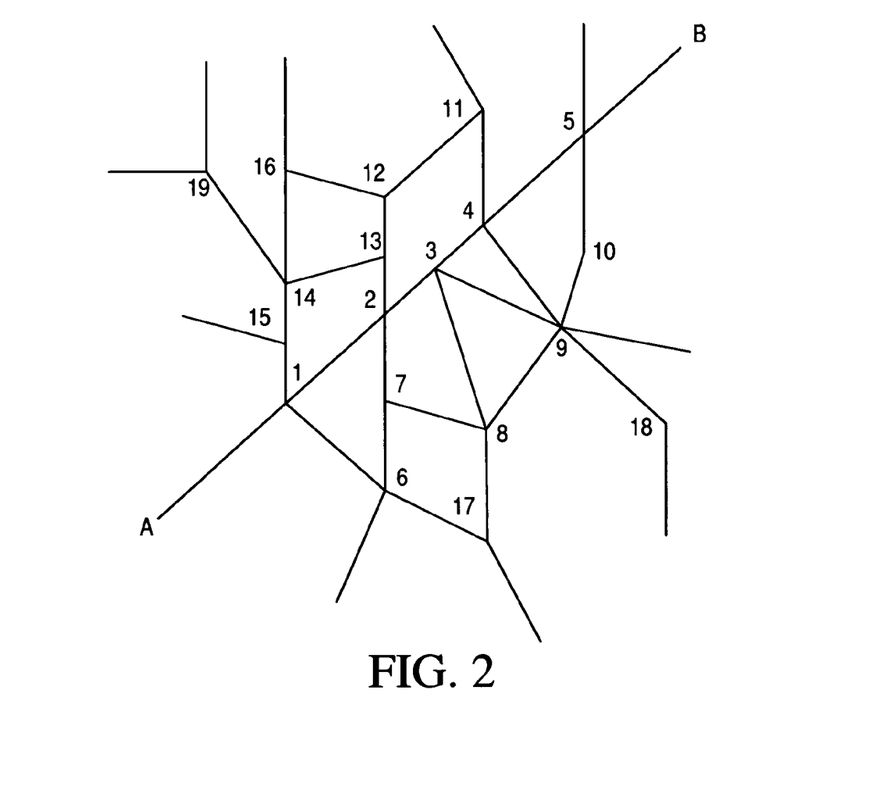
FIG. 2 depicts a more detailed diagram of the architecture of a network in a manner consistent with the present invention depicted in FIG. 1.

In FIG. 2 one may note that in a relatively small network with less than 20 relays, there are thousands of routes data can take.

The Secure Transport system may use both secure relays and standard non-secure relays, such as traditional routers or other network devices (e.g., Cisco routers). In other examples, Secure Transport may be over private/semi-private networks of which all relays will be Secure Transport relays while other implementations of Secure Transport will transmit over Secure Transport relays as well as relays that are not secure transport relays. In such instances where non secure transport relays are used, Secure Transport datagrams will appear to be standard IP traffic and the non secure transport relay will forward these datagrams to other transport relays, which may include Secure Transport relays. Thus, the Secure Transport system may be effectively used in existing networks where replacement of all relays would be not cost effective. Only when a Secure Transport datagram is relayed to a Secure Transport relay will information related to the Secure Transport be obtainable.

System Processes

Figure 6:
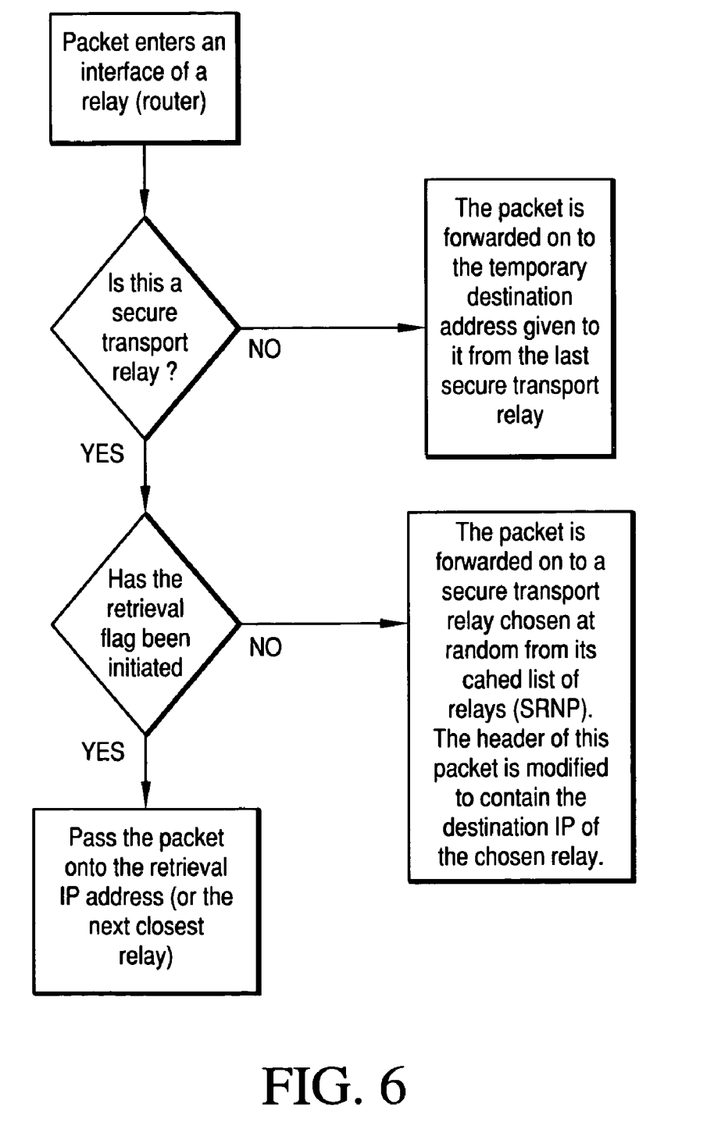
FIG. 6 depicts a flow chart of the steps for packet information entering relays consistent with the principles of the present invention.

FIG. 6 depicts a flow chart of the steps for packet information entering relays consistent with the principles of the present invention To achieve this type of secure transport, two modifications to current routing schemes would need to occur.

Figure 3:
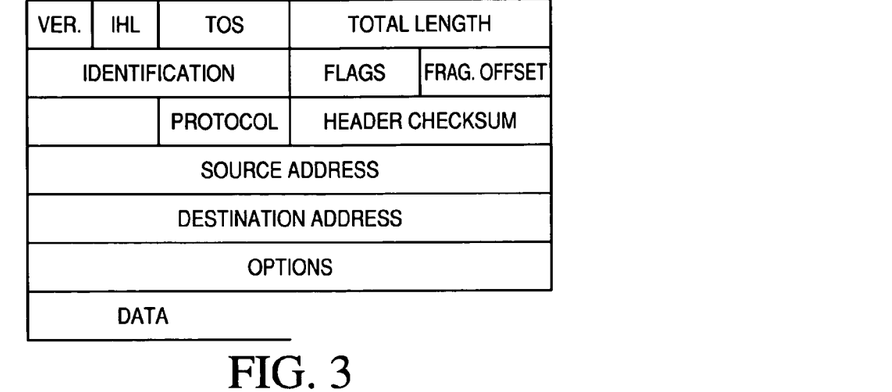
FIG. 3 depicts an exemplary Internet Protocol header.
Figure 4:
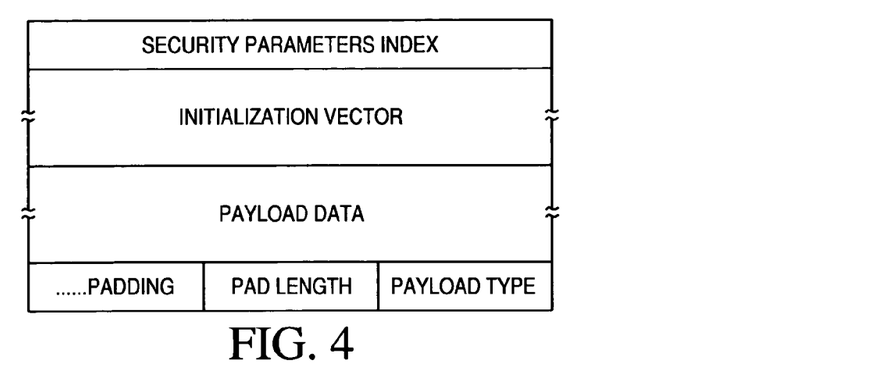
FIG. 4 depicts an exemplary Internet Protocol Security header.

If Internet Protocol (IP) were to be employed as the communication protocol (see FIG. 3 for the IP header) then as an example, IPSec datagrams would need to be encapsulated in Secure Transport datagrams, just as IP datagrams are encapsulated in IPSec datagrams. (RFC 1829, FIG. 4) [As all of this information is "encapsulated" there is often a concern for performance (how fast can the devices encapsulate and de-capsulate datagrams) but current hardware implementations can operate at teraflops per second.] IPSec datagrams (FIG. 4.) would be encapsulated inside Secure Transport datagrams (FIG. 5.) and re-sequencing data would be embedded within the data payload portion of the IPSec datagram. In case a datagram were to cross a non-secure router, that router would still know to forward that datagram to another secure transport router. The mechanism behind this behavior would be that the secure transport router just "upstream" from a non-secure transport router would place a destination address bound for the chosen secure transport router from its "cached table". A table of secure transport routers can be created by any number of methods, perhaps a Secure Router Notification Protocol (SRNP). This notification protocol would be very similar to other Routing Protocols such as Routing Information Protocol (RIP) or Open Shortest Path First (OSPF).

Modification of the IP/IPSec protocol stack on the relay to allow for new functionality that could be required to perform secure transport. The first example of new functionality would be the addition of Secure Router Notification Protocol (SRNP) to build a list or "table" of known secure relays. The second example would be the necessity to randomly choose a secure relay to forward the IPSEC datagram onto and the third is the addition of code that should a "retrieval" datagram with a special flag be set—the behavior of the secure transport router would be altered to forward any and all secure datagrams it receives to the "retrieval destination".

Client Architecture

With the notion of data traveling many paths on for the purposes of secure transport as well as storage and modification of currently used protocols one must now focus on the Initialization and Retrieval of Data to fully understand these new methods. To best understand initialization and retrieval read the following example:

A 100 kb file needs to be securely transmitted from research facility A to Smart Bomb manufacturer B (lets assume it's a diagram of new prototype). This 100 kb file would be fed into A's secure transport "client" (see an example user interface in FIG. 7), which would breakdown the file into 100 small 1 kb datagrams. The client would then multiply the number of datagrams, in this case the multiplier will be 3 (the higher the multiplier, the faster retrieve and the more redundant, but then the more data "storage" in use). We now have 300 1 kb datagrams. These 1 kb datagrams have a traditional IP header and payload that is then encapsulated by an IPSEC header that are now shuffled into some random order and then released to bounce between the secure transport relays. When B holds out a "magnet", all these datagrams are gathered at B's secure transport "client".

The secure transport client referred to above is computer program responsible for a number of activities, possibly maintaining a key ring, listing available programs to retrieve (because the client itself can act as a relay), send new files over the secure transport relay system. Advanced features could include setting the level of redundancy of the data (in the above example we set the 100 kb file to have 3 "streams" or "copies" of the data on the secure transport relay system. Another advance features could be to define auto-retrieval sequences at scheduled times or events, also the client could also be set to limit the secure transport relay's to just a few defined units they may have special properties or that are controlled by trusted peers.

Figure 7:
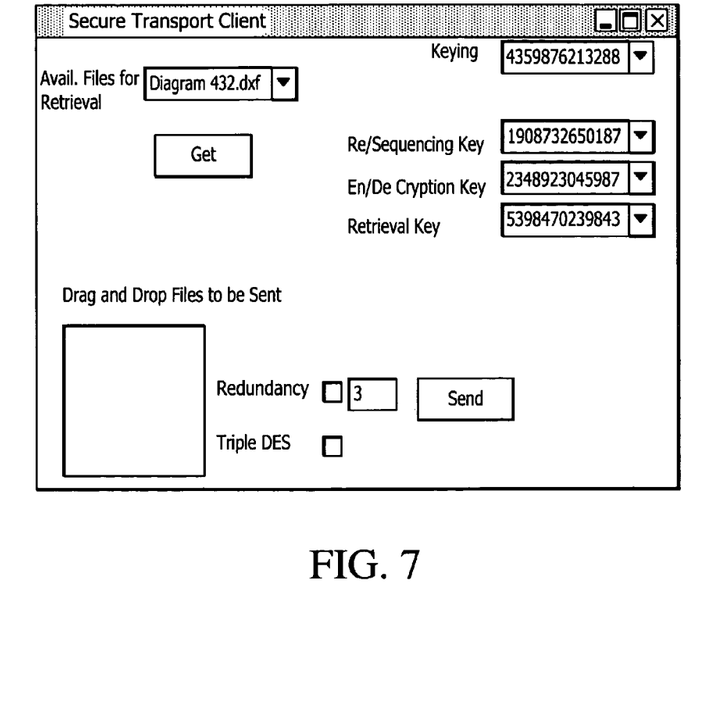
FIG. 7 depicts an exemplary client user interface consistent with the principles of the present invention.

The user interface in FIG. 7 may be used on a computer, which contains a memory, a secondary storage device, a central processing unit (CPU), an input device, and a video display. Memory may include a program that allows users to interact with secured transport relays by transmitting and receiving keys, such as web pages.

Secondary storage device may contain a database that includes information relating to various keys rings, files, or secure transport relays.

Although aspects of the present invention are described in terms of relays and routers, one skilled in the art will appreciate that these aspects may reflect additional situations, such as node hopping, wireless LANS, VPNs, or even WANs. Additionally, although aspects of the present invention are described as being stored in memory, one skilled in the art will appreciate that these aspects may be stored on or read from other computer readable media, such as secondary storage devices, like hard disks, floppy disks, and CD-ROM; a carrier wave received from a network like the Internet; or other forms of ROM or RAM. Additionally, although specific components and programs of the various computer and/or servers have been described, one skilled in the art will appreciate that these may contain additional or different components or programs.

Data Process

Figure 8:
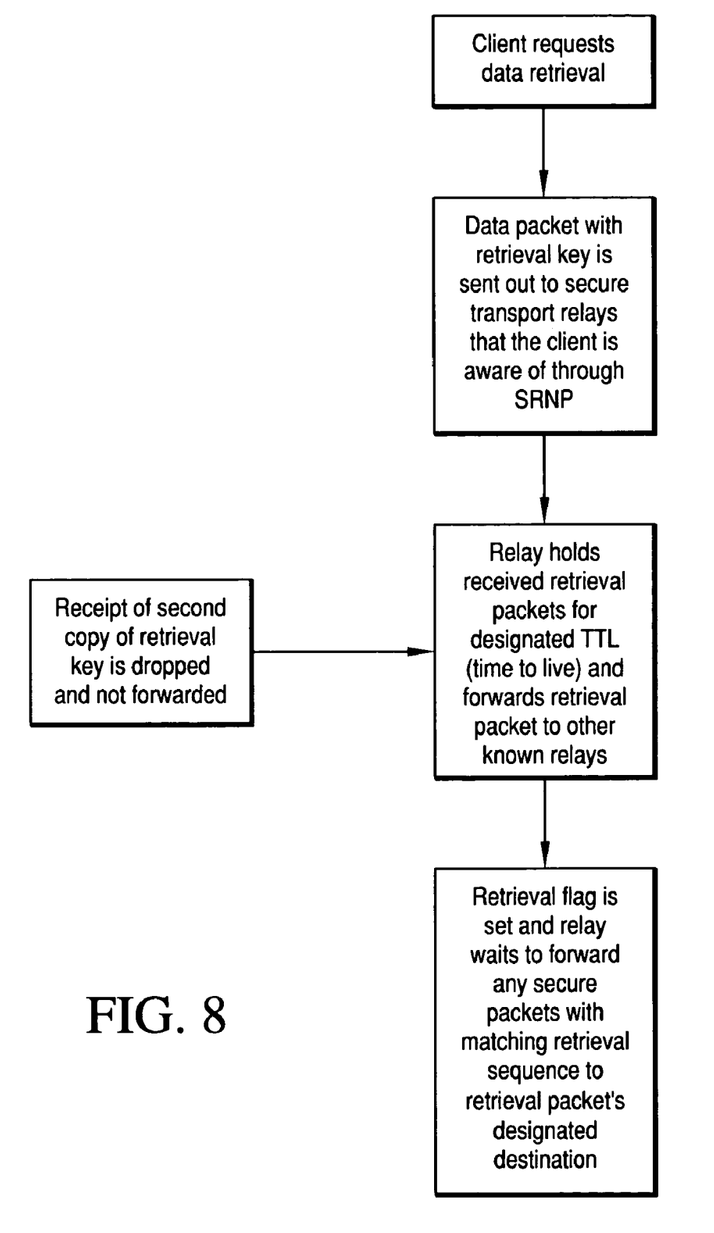
FIG. 8 depicts an exemplary retrieval sequence as viewed by a relay consistent with the principles of the present invention

FIG. 8 depicts an exemplary retrieval sequence as viewed by a relay consistent with the principles of the present invention.

In the above example (Client Architecture) the "Magnet" is the retrieval key. This retrieval key could be an IPSEC datagram with two pieces of information that could be interpreted by a Secure Transport Relay. The first piece of information would be a unique identifying flag that would set the relay to look for specific Secure Transport datagrams (say all of those datagrams associated with the 100 kb diagram of the Smart Bomb), the second piece of information would tell the relay the destination for these identified datagrams (FIG. 8).

Figure 5:
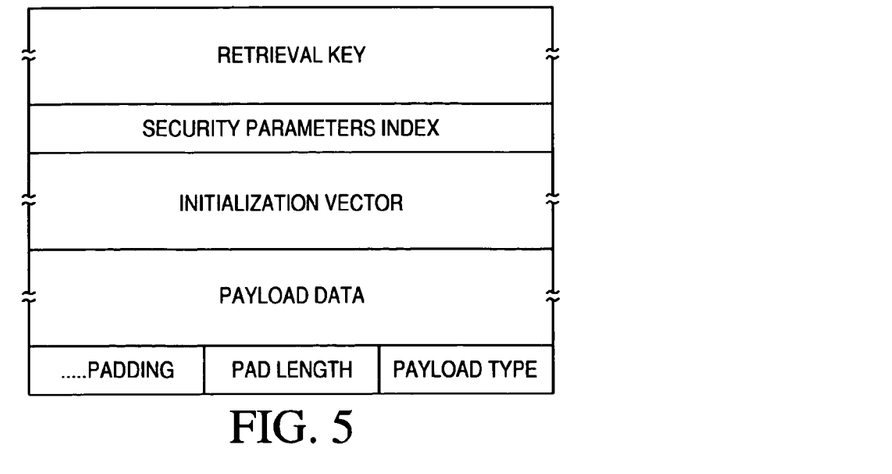
FIG. 5 depicts an exemplary Internet Protocol header with secured transport consistent with the principles of the present invention.

Now multiple IPSec tunnels can exist between two peers to secure different data streams, and each tunnel would a separate set of security associations. For example, some data streams might be just authenticated while other data streams are both encrypted and authenticated. With the possibility of multiple IPSec tunnels there may also be multiple IPSec traffic, Secure Transport Traffic, SRNP traffic and Retrieval Datagram traffic on any relay. The Security Parameters Index (FIG. 5) field in the secure transport header datagrams can list unique identifiers necessary for the secure transport relay to identify the proper course of action for the packet:

1. To randomly choose another secure relay to forward the datagram to or

2. Send datagram to be retrieved since a key match was made

To better understand how the re-sequencing of Secure Transport datagrams would occur, read the following excerpt from RFC 815, which covers the re-sequencing of fragmented IP datagrams RFC 815:

The general form of the algorithm is as follows. When a new fragment of the datagram arrives, it will possibly fill in one or more of the existing holes. We will examine each of the entries in the hole descriptor list to see whether the hole in question is eliminated by this incoming fragment. If so, we will delete that entry from the list. Eventually, a fragment will arrive which eliminates every entry from the list. At this point, the datagram has been completely reassembled and can be passed to higher protocol levels for further processing. The algorithm will be described in two phases. In the first part, we will show the sequence of steps which are executed when a new fragment arrives, in order to determine whether or not any of the existing holes are filled by the new fragment. In the second part of this description, we will show a ridiculously simple algorithm for management of the hole descriptor list.

Fragment Processing Algorithm

Arriving fragment can fill any of the existing holes in a number of ways. Most simply, it can completely fill a hole. Alternatively, it may leave some remaining space at either the beginning or the end of an existing hole. Or finally, it can lie in the middle of an existing hole, breaking the hole in half and leaving a smaller hole at each end. Because of these possibilities, it might seem that a number of tests must be made when a new fragment arrives, leading to a rather complicated algorithm. In fact, if properly expressed, the algorithm can compare each hole to the arriving fragment in only four tests. We start the algorithm when the earliest fragment of the datagram arrives. We begin by creating an empty data buffer area and putting one entry in its hole descriptor list, the entry which describes the datagram as being completely missing. In this case, hole.first equals zero, and hole.last equals infinity. (Infinity is presumably implemented by a very large integer, greater than 576, of the implementor's choice.) The following eight steps are then used to insert each of the arriving fragments into the buffer area where the complete datagram is being built up. The arriving fragment is described by fragment.first, the first octet of the fragment, and fragment.last, the last octet of the fragment.

1. Select the next hole descriptor from the hole descriptor list. If there are no more entries, go to step eight.

2. If fragment.first is greater than hole.last, go to step one.

3. If fragment.last is less than hole.first, go to step one. (If either step two or step three is true, then the newly arrived fragment does not overlap with the hole in any way, so we need pay no further attention to this hole. We return to the beginning of the algorithm where we select the next hole for examination.)

4. Delete the current entry from the hole descriptor list. (Since neither step two nor step three was true, the newly arrived fragment does interact with this hole in some way. Therefore, the current descriptor will no longer be valid. We will destroy it, and in the next two steps we will determine whether or not it is necessary to create any new hole descriptors.)

5. If fragment.first is greater than hole.first, then create a new hole descriptor "new_hole" with new_hole.first equal to hole.first, and new_hole.last equal to fragment.first minus one. (If the test in step five is true, then the first part of the original hole is not filled by this fragment. We create a new descriptor for this smaller hole.)

6. If fragment.last is less than hole.last and fragment.more fragments is true, then create a new hole descriptor "new_hole", with new_hole.first equal to fragment.last plus one and new_hole.last equal to hole.last. (This test is the mirror of step five with one additional feature. Initially, we did not know how long the reassembled datagram would be, and therefore we created a hole reaching from zero to infinity. Eventually, we will receive the last fragment of the datagram. At this point, that hole descriptor which reaches from the last octet of the buffer to infinity can be discarded. The fragment which contains the last fragment indicates this fact by a flag in the internet header called "more fragments". The test of this bit in this statement prevents us from creating a descriptor for the unneeded hole which describes the space from the end of the datagram to infinity.)

7. Go to step one.

8. If the hole descriptor list is now empty, the datagram is now complete. Pass it on to the higher level protocol processor for further handling. Otherwise, return.

Part Two: Managing the Hole Descriptor List

The main complexity in the eight step algorithm above is not performing the arithmetical tests, but in adding and deleting entries from the hole descriptor list. One could imagine an implementation in which the storage management package was many times more complicated than the rest of the algorithm, since there is no specified upper limit on the number of hole descriptors which will exist for a datagram during reassembly. There is a very simple way to deal with the hole descriptors, however. Just put each hole descriptor in the first octets of the hole itself. Note that by the definition of the reassembly algorithm, the minimum size of a hole is eight octets. To store hole.first and hole.last will presumably require two octets each. An additional two octets will be required to thread together the entries on the hole descriptor list. This leaves at least two more octets to deal with implementation idiosyncrasies.

There is only one obvious pitfall to this storage strategy. One must execute the eight step algorithm above before copying the data from the fragment into the reassembly buffer. If one were to copy the data first, it might smash one or more hole descriptors. Once the algorithm above has been run, any hole descriptors which are about to be smashed have already been rendered obsolete.

5. Loose Ends

Scattering the hole descriptors throughout the reassembly buffer itself requires that they be threaded onto some sort of list so that they can be found. This in turn implies that there must be a pointer to the head of the list. In many cases, this pointer can be stored in some sort of descriptor block which the implementation associates with each reassembly buffer. If no such storage is available, a dirty but effective trick is to store the head of the list in a part of the internet header in the reassembly buffer which is no longer needed. An obvious location is the checksum field. When the final fragment of the datagram arrives, the datagram length field in the internet header should be filled in.

<END OF RFC EXPERT>

Billing

Internet Service Providers, Application Service Providers and other communications carriers may also utilize the secure transport service by offering such services to its users. This way, such providers may derive revenue from the secure transport service. For example, an ISP may create secure packets for a user and require a fee from such user to put the packets into the network of relays. The ISP may also create retrieval keys and trigger billing (ex. Invoice generated or charge a credit card) based on a creation of the retrieval key. For example, the billing trigger could be based on any one or many parameters (time, size, source, destination, tariffs, encryption level, iterations of data).

Conclusion

In essence the mechanism for Secure Transport re-sequencing upon delivery would be the same as IP fragmentation and re-sequencing except that an added layer of security can be added by using PKI encryption on the Internet Header to hide the list of hole descriptors, therefore no malicious interceptor of data would know the start, middle, end or any repeat fragments of any file.

Methods and systems consistent with the present invention solve the inherent problems with existing transport systems by providing a secured transport engine that enables a user to securely transport data to another user. A method of secure transport and storage on a network that adds to many of today's commonly used methods of Public Key Infrastructure (PKI), Internet Protocol Security (IPSEC), Digital Certificates and Certificate Authorities (CA)-and dramatically increases the security during transport, redundancy, reliability, while allowing for rapid distribution.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems.

What is claimed is:

1. A secure transport system for transporting secure packets from a first node to a second node, comprising:
   a first node that creates secure packets, wherein each secure packet contains identical retrieval information;
   multiple secure relays that receive secure packets and non secure packets from multiple nodes or other secure relays, wherein said multiple secure relays are capable of identifying retrieval information in each secure packet, wherein each of said multiple secure relays forwards secure packets to another of said multiple secure relay and forwards non-secure packets to destination relays, end wherein said multiple secure relays forward secure packets to the second node when a retrieval condition has been indicated, and wherein each of said multiple secure relays forwards secure packets to another of said multiple secure relays when the retrieval condition has not been indicated; and
   a second node that creates a retrieval condition related to said retrieval information in said multiple secure packets and receives the secure packets, wherein said first or second nodes are not associated with said multiple secure relays.

2. The system of claim 1, wherein the second node creates a retrieval condition by generating a unique identifying flag that identifies said multiple secure packets that contain the same retrieval information, and wherein said second node transmits said identifying flag to said multiple secure relays to initiate transmission of said multiple secure packets to said second node, and wherein said first or second nodes may create said retrieval condition.

3. The system of claim 1, wherein the second node successively forwards multiple identical retrieval packets to said multiple secure relays, wherein each retrieval packet indicates the retrieval condition for secure packets and wherein each said retrieval packet contains a flag that instructs said multiple secure relays to identify secure packets that contain the same retrieval information.

4. A method for transmitting packets in a secure format from a first node to a second node, comprising the steps, executed in a data processing system, of:
   receiving secure packets in a first secure relay or a second secure relay from the first node wherein said secure packets contain retrieval information based on information provided by the first node;
   determining if a retrieval condition has been indicated by identifying said secure packets that contain the same retrieval information based on information provided by the second node;
   forwarding all secure packets associated with the retrieval condition to the second node if the retrieval condition has been indicated, wherein said second node may be the first node; and
   forwarding all secure packets to another secure relay if the retrieval condition has not been indicated.

5. The method of claim 4, further comprising:
   creating secure packets in a first node, wherein said secure packets contain identical retrieval information;
   transmitting the secure packets to random secure relays, wherein the random secure relays include the first secure relay and the second secure relay; and
   providing a unique identifying flag from the second node to the fist and second secure relays, wherein said unique identifying flag identifies secure packets that contain the same retrieval information.

6. The method of claim 4, wherein determining if a retrieval condition has been indicated further comprises:
   receiving a retrieval packet from the second node in the first and second secure relays that indicates the retrieval condition for secure packets, wherein said retrieval packet contains a flag that instructs said first and second secure relays to identify secure packets that contain the same retrieval information; and
   forwarding any secure packet from said first and second secure relays associated with the retrieval packet to the second node once the retrieval packet has been received.

7. The method of claim 6, further comprising: determining if a secure packet is associated with the retrieval packet by using a key algorithm.

8. The method of claim 4, wherein forwarding the secure packet to the second node further comprises forwarding secure packets associated with the retrieval condition to the second node.

9. The method of claim 4, wherein forwarding the secure packets to another secure relay further comprises:
   randomly selecting other secure relays to forward a secure packet to, wherein said secure packets are in transition and not discoverable until a retrieval condition has been indicated; and
   modifying a header associated with each secure packet to reflect the other secure relay.

10. The method of claim 4, wherein forwarding all secure packets to another secure relay further comprises the steps of:
    at the forwarding secure relay, replacing a destination header in all secure packets with a random secure relay; and
    at the forwarding secure relay, replacing a destination header in all secure packets with the second node when the retrieval condition has been indicated.

11. The method of claim 4 further comprising:
    creating secure packets, wherein said secure packets in said first node require a fee to be transmitted to said first and second secure relays;
    creating a retrieval condition, wherein said retrieval condition initiates forwarding of said secure packets to said second node;

generating a billing event and wherein said billing event is based on parameters, such as time size, source destination, encryption level, iterations of data.

12. The method of claim 4, further comprising the steps of:
forwarding all secure packets to a non secure relay, wherein said non secure relay forwards said secure packet to other secure relays based on a table.

13. The method of claim 4, wherein determining if a retrieval condition has been indicated further comprises the steps of:
at the first or second node, successively forwarding multiple identical retrieval packets to the first and second secure relays, wherein each retrieval packet indicates the retrieval condition for secure packets and wherein said retrieval packet contains a flag that instructs mid first and second secure relays identify secure packets that contain the same retrieval information.

14. A method for maintaining a secure distributed storage system by initiating a transmission of a message from a first node to a second node in a secure manner, wherein the second node may be the first node, comprising the steps, executed in a data processing system, of:
creating a set of secure packets associated with the message, wherein each secure packet contains an identical first retrieval key, wherein the first retrieval key is created by the first node;
forwarding the set of secure packets to multiple secure relays from the first node;
forwarding the set of secure packets among secure relays so long as a second retrieval key associated with the first retrieval key is not received in the said multiple secure relays, wherein said second retrieval key is created by the first or second node; and
forwarding the set of secure packets to the second node once the second retrieval key is received in the said multiple secure relays.

15. The method of claim 14, further comprising:
creating a second retrieval key in a second node, wherein said second retrieval key is associated with destination information for the set of secure packets and information for identification of said first retrieval key;
transmitting said second retrieval key from the second node to said multiple secure relays.

16. The method of claim 14, further comprising the steps of:
at the second node, resequencing the set of secure packets to recreate the message based on resequencing information associated with the set of secure packets.

17. The method of claim 16, further comprising the steps
at the second node, creating a second retrieval key based on the location of the second node, wherein said second retrieval key is created based on the following methods;
automatically using a built in time delay created during the creation of the secure packets of data, by a client transmitting a retrieval key to relays, or some other event, such as data integrity check, network outage or insufficient client funds.

* * * * *